3,449,275
KETONE PEROXIDES DERIVED FROM
3,3,5-TRIMETHYLCYCLOHEXANONE
Hans Giovanni Gerritsen, Deventer, and Hendrik Hansma, Schalkhaar, Netherlands, assignors to Koninklijke Industrieele Maatschappij Noury & van der Lande N.V., Netherlands, a corporation of Netherlands
No Drawing. Filed Sept. 17, 1965, Ser. No. 488,232
Claims priority, application Netherlands, Sept. 24, 1964, 6411123
Int. Cl. C08f 1/60; C07c 73/00
U.S. Cl. 260—22  11 Claims

ABSTRACT OF THE DISCLOSURE

New ketone peroxides represented by the general formula:

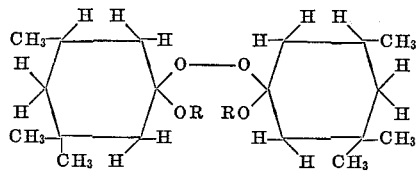

in which each R represents a hydrogen atom or an OH group are derived from 3,3,5-trimethyl-cyclohexanone by reacting same with a 35%–85% aqueous solution of hydrogen peroxide at a temperature in the range of 0° to 50° C. in the presence of an acid-reacting catalyst. The new ketone peroxides may be used in the polymerization of unsaturated polyester resins.

---

The present invention relates to new ketone peroxides derived from 3,3,5-trimethyl-cyclohexanone and to the preparation thereof. The invention also relates to the use of these peroxides as initiators in the polymerization of unsaturated polyester resins.

It is well known that the polymerization of mixtures of an unsaturated polyester and a monomer having at least one polymerizable $CH_2=C<$ group may be initiated by means of peroxides which generate free radicals, if desired in the presence of an accelerator.

In carrying out the preparation of the mixture to be polymerized, use may be made of:

(a) an unsaturated polyester obtained by reacting a polyhydric alcohol, e.g. ethylene glycol, propylene glycol or diethylene glycol, with an unsaturated dibasic carboxylic acid, e.g. maleic acid, fumaric acid or itaconic acid, and if desired in the presence of a saturated acid, e.g. phthalic acid, isophthalic acid, tetrachlorophthalic acid, malonic acid, adipic acid, sebacic acid or succinic acid; and (b) a monomer having at least one polymerizable $CH_2=C<$ group, e.g. styrene, vinyltoluene, methylmethacrylate, diallyl phthalate or divinylbenzene.

Generally, the ratio of monomer to unsaturated polyester is from 30–50 parts by weight of monomer to from 70–50 parts by weight of unsaturated polyester.

In practice, cyclohexanone peroxides are often employed as initiators and metal compounds, e.g. cobalt, manganese and vanadium compounds, as accelerators.

At room temperature, cyclohexanone peroxides are solid compounds. For saftey's sake, these peroxides have to be handled in a desensitized form, e.g. as a wetted powder, a paste generally containing a phthalate softening agent as the liquid component, or as a solution in a phosphoric ester.

The use of the above-mentioned formulations meets with difficulties when applied to the preparation of unsaturated polyester resins, as powders and pastes hardly dissolve, while solutions tend to crystallize out.

In order to obtain cyclohexanone peroxide solutions with a relatively high peroxide content which do not crystallize out at low temperatures, in practice methylcyclohexanone peroxides are added to these solutions. This has the drawback that the latter peroxides are prepared, for reasons of economy, from technical methylcyclohexanone which contains 3 isomers, the ortho isomer of which leads to the formation of unstable peroxides.

It has surprisingly been found, in accordance with the present invention, that hitherto unknown ketone peroxides derived from 3,3,5-trimethylcyclohexanone or mixtures of these peroxides are very suitable for use, inter alia, as initiators in the polymerization of unsaturated polyester resins, because these peroxides are stable and also do not need to be desensitised. Moreover, they are more reactive than the cyclohexanone peroxides known hitherto.

The new peroxides according to the present invention may be represented by the general formula:

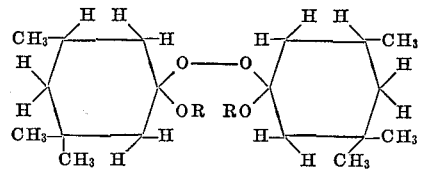

in which each R represents a hydrogen atom or an OH group.

These peroxides may be obtained by reacting 3,3,5-trimethyl-cyclohexanone with $H_2O_2$. This reaction may take place, e.g. with a 35%–85% aqueous solution of $H_2O_2$, preferably a 50% solution, at a reaction temperature between 0° and 50° C., preferably 40°–45° C., in the presence of an acid-reacting catalyst, preferably a mineral acid such as sulphuric acid, hydrochloric acid, nitric acid, etc.

The invention is further illustrated in detail by the following examples.

EXAMPLE I (a) 0.52 mole (72.8 g.) of 3,3,5-trimethyl-cyclohexanone were put into a three-necked 250 ml. flask provided with a stirrer, thermometer and a dropping funnel. Over a period of 30 minutes, 0.52 mole of $H_2O_2$, in the form of 35.4 g. of a 50% aqueous solution acidified with sulphuric acid containing 12 mg. eq. of acid per litre, were added dropwise with stirring at a temperature of 20°–30° C. The temperature of the reaction mixture was then adjusted to 45° C. and the stirring was continued for 1½ hours at this temperature. In order to improve the separation into layers, 0.8 g. of magnesium sulphate was added. After separation, the organic layer was dried over magnesium sulphate. 81.2 g. of 3,3,5-trimethyl-cyclohexanone peroxides (product A) were obtained; active O-content: 6.32%.

(b) If the amount of $H_2O_2$, 0.52 mole, mentioned in part (a) of this example is added instead in the form of 50.5 g. of a 35% aqueous solution acidified with hydrochloric acid containing 12 mg. eq. of acid per litre, 71.9 g. of 3,3,5-trimethyl-cyclohexanone peroxides (product B) are obtained under otherwise identical reaction conditions; active O-content: 4.27%.

(c) If alternatively the reaction is carried out at 20° C. and the 0.52 mole of $H_2O_2$ are added in the form of 35.4 g. of a 50% aqueous solution acidified with nitric acid containing 12 mg. eq. of acid per litre, 78.3 g. of 3,3,5-trimethyl-cyclohexanone peroxides (product C) are obtained under otherwise identical reaction conditions; active O-content: 5.19%.

EXAMPLE II

In the same apparatus as described above in Example I, 0.52 mole of $H_2O_2$, in the form of a 50% aqueous solution containing 40 mg. eq. of sulphuric acid per litre, were added dropwise with stirring over a period of 30 minutes to 0.52 mole (72.8 g.) of 3,3,5-trimethyl-cyclohexanone. The temperature of the reaction mixture rose from 20° to 32° C. Subsequently, the temperature of the reaction mixture was adjusted to 45° C. and stirring was then continued at this temperature for 1½ hours. After addition of 0.8 g. of magnesium sulphate, the aqueous layer was separated from the reaction mixture and the organic layer was dried over magnesium sulphate. 79.2 g. of 3,3,5-trimethyl-cyclohexanone peroxides (product D) were obtained; active O-content: 7.09%.

EXAMPLE III

In the same apparatus as described above in Example I, 0.57 mole of $H_2O_2$, in the form of 22.8 g. of an 85% aqueous solution containing 0.2 mg. eq. of sulphuric acid per litre, were added dropwise over a period of 30 minutes with continuous stirring to 0.52 mole (72.8 g.) of 3,3,5-trimethyl-cyclohexanone.

The temperature of the reaction mixture rose from 20° to 32° C. Subsequently, the temperature was adjusted to 45° C. and stirring was continued at this temperature for 1½ hours. After addition of 0.8 g. of magnesium sulphate, the aqueous layer was separated from the reaction mixture; the organic layer was dried over magnesium sulphate.

82.0 g. of 3,3,5-trimethyl-cyclohexanone peroxides (product E) were obtained; active O-content: 8.10%.

EXAMPLE IV

In order to determine the reactivity of each of the products A–E mentioned above in Examples I–III, either 0.0025 g. or 0.005 g. of cobalt in the form of a solution of cobalt octoate in styrene containing 1% of cobalt, was added to 100 g. of Palatal P6 (an unsaturated polyester resin of the propylene glycol maleate-phthalate type). Subsequently as glycol maleate-phthalate type in styrene as the monomer. The unsaturated polyester resin known as Palatal P6 is an old and well known resin material. The polyester therein may be prepared in a purely conventional manner by esterifying 1 mol of maleic acid and 1 mol of orthophthalic acid with 1.1 mol of ethylene glycol and 1.1 mol of propylene glycol at a temperature of about 140° C. to 200° C. in the presence of a current of $CO_2$ as a sweep gas until an acid value of 40 is obtained for the unsaturated polyester. Subsequently as much peroxide as corresponds to 2 g. and 1 g. respectively of cyclohexanone peroxide with an active oxygen content of 13.0% was added to the polyester resin/accelerator with stirring. The gel time of 10 g. of the mixture thus obtained was determined at 20° C. The results obtained are tabulated below.

| Product | Peroxide (g.) | Co solution (g.) | Gel time (min.) |
|---|---|---|---|
| A | 4.10 | 0.25 | 13 |
|   | 2.05 | 0.50 | 13 |
| B | 6.08 | 0.25 | 8 |
|   | 3.04 | 0.50 | 14 |
| C | 5.0 | 0.25 | 6 |
|   | 2.50 | 0.50 | 9 |
| D | 2.74 | 0.25 | 27 |
|   | 1.37 | 0.50 | 28 |
| E | 3.20 | 0.25 | 9 |
|   | 1.60 | 0.50 | 8 |
| Cyclohexanone peroxide | 2.00 | 0.25 | 54 |
|   | 1.00 | 0.50 | 59 |

While specific examples of preferred methods and products embodying the present invention have been described above, it will be apparent that many changes and modifications may be made in the details of the methods of procedure and products without departing from the true spirit of the invention. It will therefore be understood that the particular methods and products set forth above are intended to be illustrative only, and are not intended to limit the scope of the invention which is defined by the following claims.

What is claimed is:

1. A stable organic peroxide having the general formula:

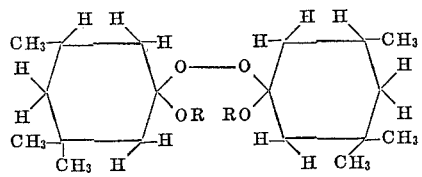

in which each R represents a hydrogen atom or an OH group.

2. A composition comprising a mixture of organic peroxides as defined in claim 1.

3. A process for the preparation of a stable organic ketone peroxide-containing material, which comprises reacting 3,3,5-trimethyl-cyclohexanone with a 35%–85% aqueous solution of hydrogen peroxide at a temperature in the range of 0° to 50° C. in the presence of an acid-reacting catalyst.

4. A process according to claim 3, in which a 50% aqueous solution of hydrogen peroxide is used.

5. A process according to claim 3, in which the reaction temperature is in the range of 40° to 45° C.

6. A process according to claim 3, in which a catalytic quantity of a mineral acid is used.

7. A process according to claim 6, in which the catalyst is sulphuric acid, hydrochloric acid or nitric acid.

8. A process for the polymerization of an unsaturated polyester resin, in which the polymerization of the unsaturated polyester resin is carried out in the presence of a stable peroxide-containing material as defined in claim 1 as an initiator.

9. A process according to claim 8, in which an accelerator is also present.

10. A process according to claim 9, in which the polymerization is carried out at room temperature using a cobalt compound as an accelerator.

11. A process according to claim 10, in which the accelerator is cobalt octoate.

References Cited

UNITED STATES PATENTS 3,211,796  10/1965  Pajackowski _____ 260—610

FOREIGN PATENTS 873,614  7/1961  Great Britain.
1,060,857  7/1959  Germany.

HOSEA E. TAYLOR, Jr., *Primary Examiner.*

R. W. GRIFFIN, *Assistant Examiner.*

U.S. Cl. X.R.

260—23, 75, 610, 861, 863